United States Patent
Menage

[11] 3,763,936
[45] Oct. 9, 1973

[54] METHOD AND APPARATUS FOR INJECTING FIRE EXTINGUISHING LIQUIDS INTO A FUEL-CARRYING PIPE

[75] Inventor: Georges H. Menage, Neuilly Sur Seine, France

[73] Assignee: Compagnie Francaise des Petroles, Paris, France

[22] Filed: Mar. 2, 1971

[21] Appl. No.: 120,226

[30] Foreign Application Priority Data
Mar. 3, 1970 France .................... 7007569
Feb. 9, 1971 France .................... 7104249

[52] U.S. Cl. .................. 169/1 A, 166/90, 169/2 R, 239/453, 239/551
[51] Int. Cl. ............................... A62c 1/06
[58] Field of Search .................. 169/1 A, 2 R; 166/90; 239/551, 562, 453, 533; 137/542, 540

[56] References Cited
UNITED STATES PATENTS
| 1,552,342 | 9/1925 | Porter | 166/90 |
| 3,129,891 | 4/1964 | Vdoviak | 239/453 X |
| 1,640,839 | 8/1927 | Kliewer | 166/90 |
| 1,744,659 | 1/1930 | Moore | 166/90 |
| 3,268,009 | 8/1966 | Bussey et al. | 169/2 R X |
| 3,201,050 | 8/1965 | Simmons et al. | 239/453 |
| 3,243,127 | 3/1966 | Watson | 239/453 |

FOREIGN PATENTS OR APPLICATIONS
| 260,379 | 11/1926 | Great Britain | 166/90 |
| 46,203 | 8/1925 | Germany | 166/90 |

Primary Examiner—M. Henson Wood, Jr.
Assistant Examiner—Michael Mar
Attorney—Sughrue, Rothwell, Mion, Zinn & Macpeak

[57] ABSTRACT

A method and apparatus to prevent ignition or inhibit re-ignition of a fuel issuing from a conduit in which an extinguishing liquid is injected into the fuel upstream of the conduit outlet and a turbulence is established by the injection and/or by the conduit cross-section which intimately mixes the fuel and liquid throughout the cross-section of the fuel upstream of the outlet.

25 Claims, 8 Drawing Figures

METHOD AND APPARATUS FOR INJECTING FIRE EXTINGUISHING LIQUIDS INTO A FUEL-CARRYING PIPE

The invention relates to a method which permits ignition or re-ignition of a fluid fuel to be prevented and accidental flames to be extinguished rapidly by injecting fire-extinguishing liquid into a pipe for the fluid fuel and more particularly, in the case of an oil well, into the well head. The invention also relates to the apparatus for use in carrying out the method.

Experience shows that some flames, particularly those produced at the head of an oil well, very soon become difficult to extinguish due to the large quantity of heat evolved in combustion, as the accumulation of heat almost always causes the fuel to re-ignite after the flame has been extinguished. If, therefore, installations are not to be destroyed it is essential for the extinguishing means to make the flame disappear within a very short time, of the order of a few seconds. Also, the means used must prevent ignition from occurring in the event of a fuel leak, and re-ignition after a flame has once been extinguished.

Various extinguishing means have been proposed for oil wells, but none can prevent ignition or re-ignition. One of the oldest proposals is the provision of a number of orifices in the casing, at the well head, into which lead ducts controlled by valves which bring water from various reservoirs. To prevent oil from entering the ducts, and to facilitate the entraining of the water by the oil, the axes of the injection orifices are at an angle to the casing axis. Unfortunately, the absence of water pressure prevents extinction of the flames unless the oil flow rate is very low (less than 5 $m^3/h$).

According to another proposal, a series of ducts ending in ejector nozzles whose axes are parallel to the flame axis are provided at the base of the flame, so that the latter is surrounded with fire-extinguishing substances and is completely isolated from the air. The extinguishing liquid flow rate must be at least of the same order of magnitude as the gas flow rate and at least twice the flow rate of the oil from the well, however, and obviously there must be no wind or any material obstacle to deflect the jets of fuel and of extinguishing fluid.

Although it is well known that a flame can be extinguished either by depriving it of any contact with air or by introducing an extinguishing substance into the combustible substance upstream of the flame in order to form a non-flammable mixture, there has been no effective means of extinguishing flames fed by large quantities of oil except by blowing them out with a large explosive charge.

Numerous experiments carried out by the applicants have shown that the ineffectiveness of the method of extinguishing flames by adding extinguishing substances, particularly water, to the fuel feeding the flame derived from the fact that, for a given arrangement of the water injectors in the fuel pipe, the quantity and pressure of the water injected to cause extinction were not proportional to the fuel flow rate, and also the addition of more water than there was fuel did not necessarily bring about extinction.

The invention relates to a novel method of extinguishing flames and of preventing ignition or reignition of a fluid fuel; in which an extinguishing fluid, more particularly water, is injected into the conduit supplying the fluid fuel, and a turbulent zone is created artificially across the whole of the mixture of fuel and extinguishing fluid upstream of the flame and downstream of the zone in which the extinguishing fluid is injected, to give a homogeneous mixture at the base of the flame.

In contrast to the prior apparatus and methods in which the flame was surrounded by the extinguishing substance, and also to cases in which the stream of fuel was either interrupted by injecting a certain quantity of heavy products or made substantially non-flammable by injecting a certain quantity of water, therefore, the invention provides for the creation, after injection of the extinguishing substance, of a turbulent zone which mixes the fuel and extinguishing substance intimately and very rapidly. Experience shows that it is then possible to considerably reduce the quantity of extinguishing substance introduced and the injection pressures in order finally to obtain a completely non-flammable mixture, extinguishing the flame and simultaneously preventing any subsequent re-ignition.

According to the present invention, there is further provided apparatus for extinguishing and inhibiting re-ignition of fluid fuel issuing from a conduit which comprises a pipe for insertion in the conduit, the pipe including injection means having ports communicating with the pipe bore for supply of extinguishing liquid to that bore and turbulence creating means operable to mix the fuel and extinguishing liquid.

In one embodiment of this method, turbulence creating means is advantageously a conduit of varying cross-section and/or injections with an appropriate configuration.

The pipe bore is preferably a body of revolution ending in cylindrical portions, the injection means being equispaced around the axis of the body of revolution and being of a type to produce a jet enabling the extinguishing liquid to penetrate right into the fluid fuel.

Experience shows, however, that for injection pressures of the order of 200 bars and flow rates of 25 $m^3/h$, no known injector can give a sufficiently intimate mixture due solely to injection of the extinguishing fluid followed by creation of an artificial turbulence.

The injection means may comprise an injector including a needle resting on a seat surrounding a passage leading into the bore of the pipe, a spring urging the needle on to its seat, a chamber, preferably of revolution, surrounding that portion of the needle upstream of the seat, ducts connected to a passage for supplying extinguishing liquid and leading into the said chamber tangentially relative to its walls, and a hydraulic reaction circuit including a piston exposed to the bore and operable by way of hydraulic fluid to exert on the needle in a direction toward the seat a pressure proportional to the pressure of the fluid fuel in the bore.

Experience shows that, whatever the variation in the pressure of the fluid fuel, an injector of this kind enables the needle to be held on its seat in a fluid-tight manner and the extinguishing fluid to be injected only at a pressure (of this fluid) depending on the fuel pressure. Also, injection of the extinguishing fluid occurs only when the pressure of this liquid is greater than that of the fluid fuel, the injector forming a highly cohesive whirling jet with a strong axial impetus.

As a result, the fuel and the extinguishing liquid are mixed intimately even when the fuel pressures and flow rates are very high.

The apparatus may have, in addition to the preceding injectors, another series of injectors downstream of the preceding injectors and comprising a valve disc resting on a seat surrounding a passage leading into the bore of the pipe, a spring urging this disc on to its seat, a chamber, preferably of revolution, surrounding that portion of the disc upstream of the seat, a duct connected to a passage for supplying extinguishing liquid which leads into the said chamber tangentially relative to its walls, and means for adjusting the force exerted by the spring.

Merely by suitably adjusting the spring, therefore, the disc can be prevented from opening except when the extinguishing-liquid pressure is greater than a given value. Also, whatever the variations in the fuel pressures, the fuel cannot penetrate into the chamber of revolution. If a recess through which the passage leads on to the bore becomes clogged a very gentle action is enough to break the crust formed on the circular edge on which the disc seats. The effect of this recess is to enable a whirling sheet to penetrate readily into the central cavity while leaving a considerable quantity of the extinguishing liquid in the peripheral zones of the stream of fuel, already disturbed by the whirling jets from the needle-type injectors.

Experience shows that, if the fuel conduit downstream of the injection means is more than a few metres long, it is possible to omit the needle-type injectors while still obtaining the same protection, so giving injection apparatus which extinguishes flames effectively and economically and prevents any ignition or re-ignition of the fuel.

Also, by varying the shape of the recess leading on to the central cavity, the whirling jet can be reflected off the walls of the recess to re-form a jet penetrating right into the stream of fuel.

The shape may be varied by providing a detachable injector nozzle in a body member which defines the passage. The injector nozzle will have a profile in a plane containing the bore axis such as will provide the desired configuration of injection fluid jet. The nozzle will be readily replaceable where conditions change, such as the conduit being turned over to a different fuel, or it may be replaced by an obturator if that particular injector is no longer required. Such changes do not require the entire pipe section to be replaced as would otherwise be necessary. The nozzle aperture adjacent the valve seat is greater than the valve diameter.

Other features of the invention will be clear from the following description with reference to the accompanying drawings, illustrating an embodiment of the extinguishing apparatus by way of example.

In the drawings:

FIG. 5 is a section, on a plane perpendicular to the axis of the apparatus through an embodiment of the disc-type injector used in the upper portion;

Figure 1:
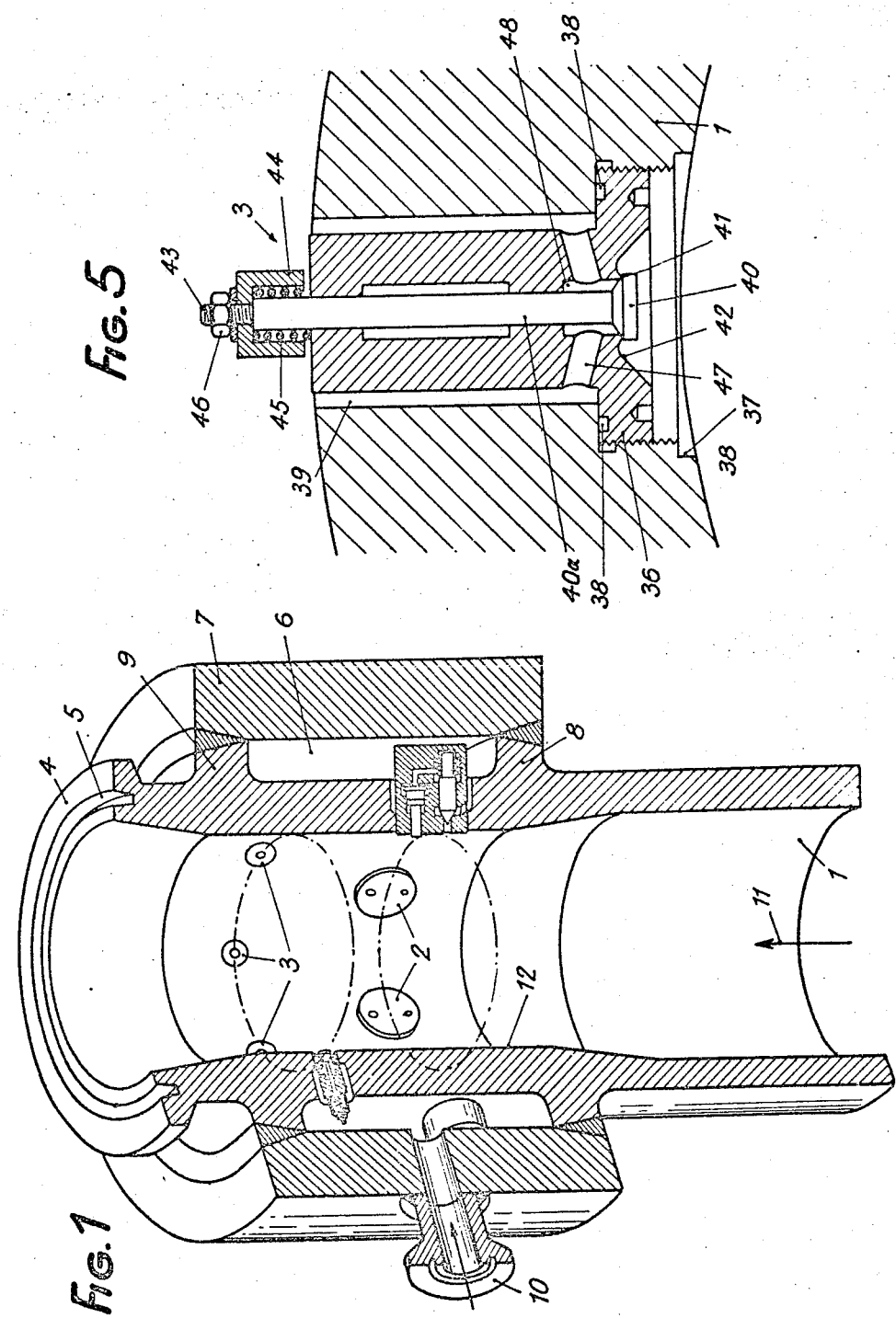
FIG. 1 is a perspective view of the tubular element of this apparatus, the portions between two axial sections having been cut away.
Figure 2:
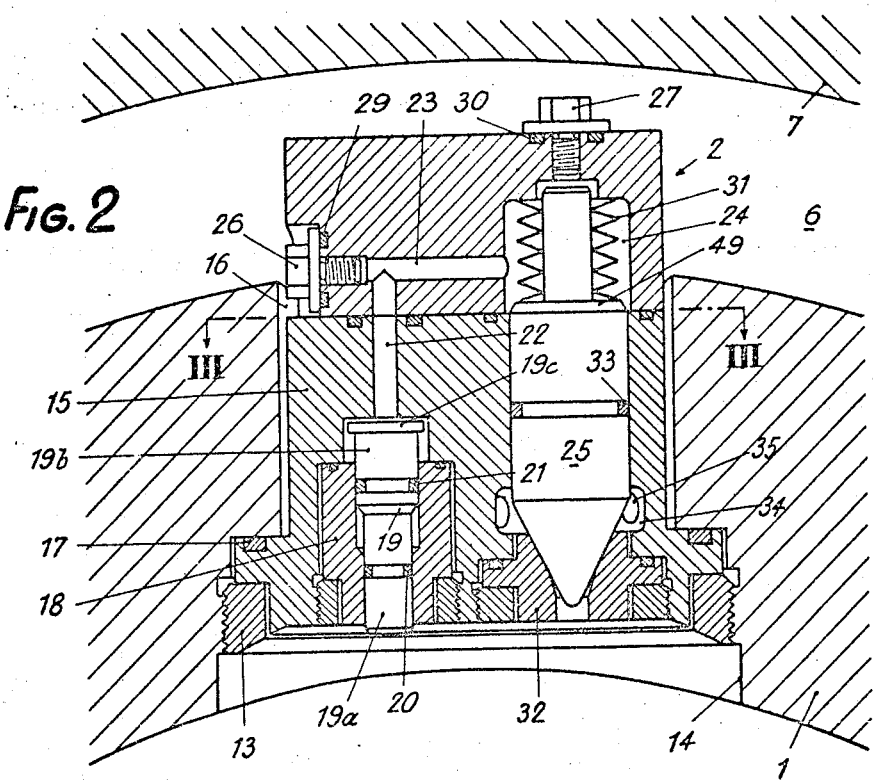
FIG. 2 shows a section, on a plane perpendicular to the axis of the apparatus, through an embodiment of the needle-type injector used in its lower portion.

The injection apparatus shown in FIG. 1 consists essentially of a central element or body 1, in whose wall are mounted a first series of injectors such as the injector 2 shown in FIG. 2 and, downstream of this series, a second series of injectors like the injector 3 shown in FIG. 5. In a preferred embodiment of the invention, the axes of the injectors are perpendicular to the axis of the element 1, experience having revealed that the fluid fuel and extinguishing liquid mix more homogeneously at high pressures. The ends of the tubular element 1 may be of any shape which enables the apparatus to be inserted in a fluid-tight manner anywhere along a pipe for fluid fuel.

By way of example, the apparatus may be inserted at the head of an oil well and have, in addition to a flange 4 and its seal groove 5, a flange similar to the lower portion of the element 1. Alternatively, the apparatus may be incorporated in any tubular element of a pipe for fluid, including the casing head.

The outer portions of the injections in the two series lead into a chamber 6 formed by the outside wall of the tubular element 1 and by an annular element 7 welded on to flanges 8 and 9, which may belong either to the tubular element 1 or to the annular element.

A duct 10 supplies water or some other appropriate extinguishing fluid to the chamber 6.

To ensure intimate mixing of the fluid (for example oil) entering the element 1 in the direction indicated by the arrow 11, the passage cross-section for the fluid is restricted in a portion 12. The increase in cross-section at the exit from the central zone promotes turbulence which completes the mixing.

The embodiment illustrated has six injectors of the same type as injector 2, and the injectors 3 in the upper series are staggered relative to those in the lower series.

The injectors 2 (FIG. 2) are of the needle type. Each needle injector has a threaded ring 13 at the upper portion of a recess 14 in the tubular element 1. A cylindrical element 15, smaller in diameter than the bore 16 in the element 1 is mounted in the ring 13 in such a way as to leave a passage for the extinguishing fluid introduced into the chamber 6. A seal 17 seals this passage off from the fuel pipe.

The cylindrical element 15 contains an element 18 with a first bore, receiving the lower portion 19a of a piston 19, and a second bore slightly larger in diameter and receiving the portion 19b of the piston, whose cross-section is greater than that of the portion 19a. The end 19c of the piston, which is larger in diameter than the second bore in the element 18, moves in a bore in the element 15. This last bore contains hydraulic fluid. Seals 20 and 21 eliminate any risk of the fuel mixing with the hydraulic fluid. Ducts 22, 23 carry the hydraulic fluid to a recess 24 above the body of the needle-type injector 25. Bolts 26, 27 forming plugs close the duct 23 and chamber 24 and permit introduction and draining of the hydraulic fluid. Seals 29, 30 ensure that the device is fluid-tight.

A spring 31 applies the needle of the injector to the seat 32, while a seal 33 prevents any communication between the hydraulic fluid and the fuel.

Between the seat 32 and the bore housing the injector member 25 in the element 15 lies a chamber 34, into which lead ducts 35 (FIG. 3) connecting this chamber 34 to the passage 16. These ducts feed the extinguishing liquid tangentially to the walls of the chamber 34.

Figure 3:
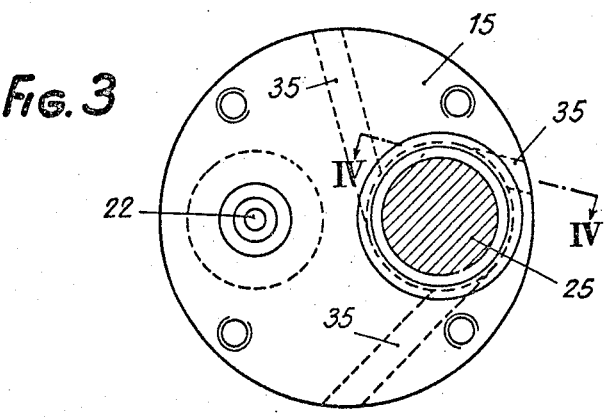
FIG. 3 shows a cross-section through the injector shown in FIG. 2, on a line III—III.
Figure 4:
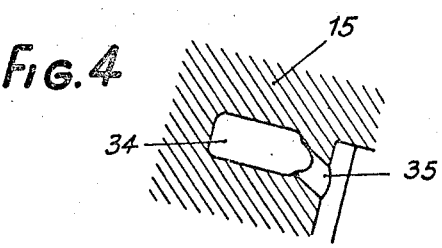
FIG. 4 shows a partial section on a line IV—IV in FIG. 3.

A cross-section through the chamber 34 on a plane IV—IV in FIG. 3 is shown in FIG. 4, with one of the ducts 35 connecting the chamber 34 to the passage 16.

The injector 3 shown in FIG. 5 represents one of the injectors in the upper series of injectors mounted in the apparatus shown in FIG. 1. It has a threaded body 36 screwed into a threaded portion of a bore above a recess 37 in element 1. Seals 38 provide a seal between an annular passage 39, permanently commumicating with the chamber 6, and the recess 37 bathed by the fuel.

The disc 40 bears on the circuit edge 41 of a contoured portion 42 of the base 36 close the chamber of revolution 48. The end of the stem 40a of the disc is fixed to a screw 43 extending through a housing 44 containing a spring 45. The latter bears on the upper portion of the injector body and is retained by the housing 44, which in turn is held on by a nut 46. Ducts 47 connect the annular passage 39 to the chamber of revolution 48 closed by the disc 40. These ducts lead into the walls of this chamber tangentially.

At the instant when a flame is produced, an oil pressure Ph prevails in the interior of element 1 (FIG. 1), whereas the peripheral chamber 6 is not subject to any pressure. As a result, the piston 19 in each needle-type injector 2 (FIG. 2) communicates to the hydraulic fluid in the duct 22, 23 a pressure $Pf = k\ Ph$, $k$ being equal to the ratio between the cross-section 19a of the piston subject to the oil and the cross-section 19b of the piston acting on the fluid. This pressure communicates to the back face 49 of the needle 25 a force proportional to the pressure of the hydraulic fluid and therefore proportional to that of the oil. In spite of the oil pressure, therefore, the needle 6 tends to bear harder on its seat 32, the oil pressure being applied only to a very small area on the end of the needle 25. In the absence of water, i.e. if the extinguishing apparatus has not been set off, any increase in the oil pressure will therefore reinforce the seal between the needle and its seat.

If the water pressure in the chamber 6 progressively increases from zero while the oil pressure is constant, therefore, the water introduced into the chamber 34 will act on all the area of the needle between the maximum diameter of the needle and the line of contact between the needle and the edge of its seat 32. The resulting force opposes the forces exerted by the spring 31 and the oil pressure acting on the surface 49 by way of the hydraulic fluid.

When the water pressure is sufficient, the needle rises. If the water pressure is kept constant, this lifting of the needle takes place cleanly, since the water then acts abruptly on a larger area of the needle and the water therefore flows readily and rapidly.

Operation of the disc-type injector is also initiated by the increase in the water pressure. In the idle position, the flared portion of the disc 40 (FIG. 5) is urged on to its seat 41 by the spring 45. If the oil pressure rises, it acts on the inside surface of the disc 40, which therefore bears harder on its seat 41.

Opening cannot occur, therefore, unless the force exerted by the water pressure in the chamber 48 is greater than the forces exerted by the spring 45 and the oil pressure, which means, given the areas on which these forces act, that the water pressure must be considerably greater than the oil pressure.

As a result, both the needle injectors and the disc injectors inject the water into the oil cleanly and abruptly once the water pressure is distinctly greater than the oil pressure, whereas, in the absence of water pressure, any increase in the oil pressure reinforces the fluid-tightness of the injectors.

At the instant when injection occurs, the needle-type injector gives the sprayed jet a very strong axial impetus, forcing the jet to reach the centre of the column of fluid fuel, whereas the disc-type injector provides a whirling jet which penetrates only into the peripheral layers of the fuel. However, the disc-type injector may be modified to give a jet with greater axial penetration. To this end, the angle of the contoured portion 42 to the injector axis will be reduced and the sheet leaving the injector around the disc will recombine, after being reflected off the surface 42, to form a jet penetrating as far as the centre of the stream of fuel.

Various modifications of details may, of course, be made to the above apparatus.

For example, the needle-type injections may be used for both series of injectors, or the needle-type injectors mounted upstream may be replaced by disc-type injections in which the angle of the contour of the straight portion to the injector axis is smaller, so that the whirling jet is reflected off this contour to give a highly cohesive jet which penetrates right into the stream of fuel.

Figure 6:
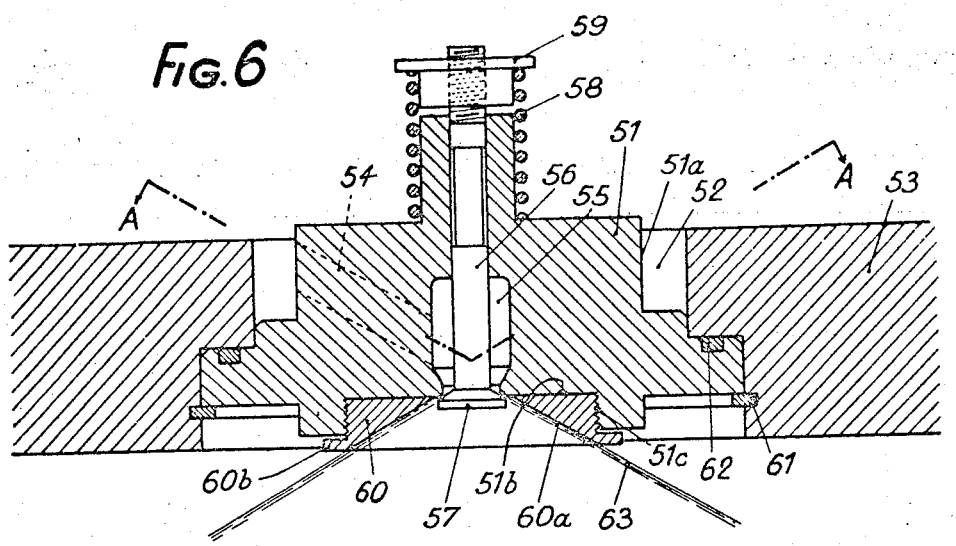
FIG. 6 is an axial section through another embodiment of injector mounted in its housing.
Figure 7:
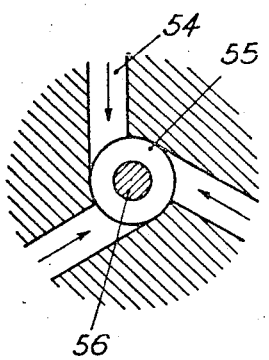
FIG. 7 is a section, taken along the line A—A in FIG. 6.

This injector has a body 51 comprising a cylindrical portion acting as the wall of an annular chamber 52 disposed between the injector and a frame 53 in which the injector is mounted. Inclined passages 54 (FIGS. 6 and 7) connect the chamber 52 to a feed chamber 55 enclosing rod 56 of an inverted conical valve 57. A helical compression spring 58 bearing against the upper portion of the body 51 and beneath a stop 59 unitary with the rod 56 urges the valve 57 against its seat.

A recess bounded by a ring 51b and a cylindrical surface 51c is screwthreaded for receiving a detachable nozzle 60.

A clip 61 inserted in the groove in the frame 53 enables the injector to be attached in its housing, a joint 62 inside a groove in the body 51 ensuring the hermeticity of the assembly.

The fluid passing through the passages 54 into the chamber 55 creates a conical eddy jet as soon as the valve 57 leaves its seat, due to the conical shape of the inner surface 60a of the nozzle and the matching shape of the valve.

When the shape of the jet is to be altered, it is enough to substitute a nozzle of a different kind for the nozzle 60.

Figure 8:
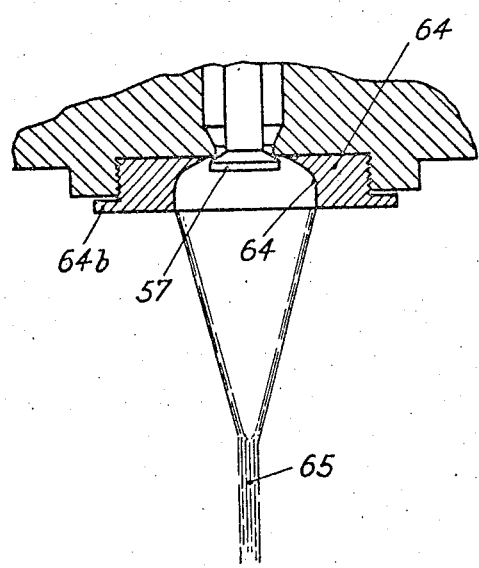
FIG. 8 is an axial section through a nozzle mounted on an injector whose upper and lateral portions have been removed.

By way of example, if instead of using a jet taking the form of a hollow diverging, highly pulverised sheet 63, like that obtained with the nozzle 60 well adapted to mixing wall layers, the intention is to create a cylindrical jet of a predetermined diameter, a nozzle of the kind illustrated in FIG. 8 and supplying an axial jet can be substituted for the nozzle 60.

To this end, to facilitate the substitution of the nozzles they comprise a flange, as 60b (FIG. 6) and 64b (FIG. 8) whose outside shape can be polygonal to allow easy screwing of the nozzle into the recess in the injector body enclosing the valve seat.

The axial jet 65 (FIG. 8) is obtained by the initial cylindrical or reversed conical shape of the surface 64a which can comprise connecting beads between the cylindrical portion and the initial conical portion whose sizes are adapted to the properties of the required jet.

The upper edge of the recess 51b may comprise a ring whose lever is above the level of the seat of the inverted valve, such ring being connected to the base of the valve seat by a frustrum. This arrangement allows more curved profiles in the beads connecting the guide surfaces for the nozzle jet. In every instance the arrangement enables the detachable nozzle to co-operate with the inverted valve to ensure that the initial jet leaving the valve adheres again to the nozzle and therefore encourages the formation of a jet of clearly defined and stable structure.

I claim:

1. An apparatus for extinguishing and inhibiting re-ignition of fluid fuel flowing in a conduit, said apparatus comprising
   a. pipe means inserted in the conduit;
   b. first nozzle means, mounted on the pipe means, for symmetrically injecting jets of diverging fine particles of extinguishing fluid into the bore of the pipe and homogeneously mixing the fuel and extinguishing fluid to form substantially adjacent relatively large volumes of the homogenous mixture; and
   c. second nozzle means for tangentially injecting extinguishing fluid into the pipe for creating a turbulent zone across the complete cross-section of the pipe thereby mixing the relatively large volumes with any remaining portions of the fuel which have not been homogenously mixed, to form a homogenous mixture across the whole cross-section of the pipe.

2. Apparatus as claimed in claim 1, in which the second nozzle means includes a variation in the cross-section of the pipe means.

3. Apparatus as claimed in claim 1, in which the first injection means are connected to a duct for supplying extinguishing fluid.

4. Apparatus as claimed in claim 1, wherein the first injection means are equispaced around the axis of the pipe means.

5. Apparatus as claimed in claim 4, wherein the first injection means comprise a needle resting on a seat surrounding a passage leading into the bore of the pipe means, a spring urging the needle on to its seat, a chamber surrounding that portion of the needle upstream of the seat, a duct for supplying extinguishing liquid leading into the chamber tangentially relative to its walls, and a hydraulic reaction circuit including a piston exposed to bore pressure and operable to exert on the needle a force in the direction of the seat proportional to the pressure of the fluid fuel.

6. Apparatus as claimed in claim 5, wherein the needle seat has a first conical portion, having the same cone angle as the needle, a second conical portion having a steeper cone angle and a cylindrical portion leading into the bore.

7. Apparatus as claimed in claim 5, wherein the reaction circuit comprises a piston with two sections such that the pressure transmitted to the circuit is different from the pressure in the bore.

8. Apparatus as claimed in claim 5, wherein the duct communicates with a cavity defined by a body and a base of the injector, the other end of the duct leading into a chamber for supplying extinguishing liquid.

9. Apparatus as claimed in claim 1, wherein the bore of the pipe means is a body of revolution and in which the first injection means includes tangential inlet means forming jets with an angular component about their axes to insure penetration of the extinguishing liquid into the fluid fuel.

10. Apparatus as claimed in claim 1, wherein the second injection means are of the type to produce a whirling jet which will penetrate only to the peripheral layers of the fluid fuel.

11. Apparatus as claimed in claim 1, wherein the second injection means comprise a valve disc resting on a seat surrounding a passage leading into the bore, a spring urging this disc on to its seat, a chamber surrounding that portion of the disc upstream of the seat, a duct for supplying extinguishing liquid which leads into the said chamber tangentially relative to its walls, and means for adjusting the force of the spring.

12. Apparatus according to claim 11 wherein the seat is defined by an edge.

13. Apparatus as claimed in claim 11 wherein said second injection means further comprises a first series of valve injectors in which the generatrix of the nozzle has a rectilinear portion whose acute angle which it forms with its axis is greater than 30°, to create an eddy sheet of extinguishing fluid penetrating only the peripheral layers of the combustible fluid, and a second series of valve injectors which are disposed downstream of the first series and in which the generatrix of the nozzle has a rectilinear portion whose angle which it forms with its axis is smaller than the corresponding angle of the generatrix of each nozzle of the first series with its axis, to create by reflection of the sheet on to such rectilinear portion, a strongly cohesive eddy jet enabling the central part of the combustible fluid to be reached.

14. Apparatus according to claim 11 further comprising a detachable nozzle adjoining the valve seat.

15. Apparatus as claimed in claim 14 wherein the detachable nozzle is formed with an outside cylindrical screwthreaded lateral surface, the injector body being formed with a reces having a cylindrical lateral wall enclosing the valve seat, the cylindrical surface of the recess being screwthreaded to receive the screwthreading of the detachable nozzle.

16. Apparatus as claimed in claim 15 wherein the dimensions of the nozzle aperture adjacent the valve are greater than the valve diameter.

17. Apparatus as claimed in claim 15 wherein the recess is a cylinder having an end in the form of a ring bounded internally by the circular edge forming the valve seat and externally by the said cylindrical surface.

18. Apparatus as claimed in claim 15 wherein the end of the recess comprises a level ring lying between that of the valve seat and a point of the valve rod, and a frustoconical surface connecting the inside edge of said ring to the valve seat.

19. Apparatus as claimed in claim 14, wherein the detachable nozzle co-operates with an inverted valve, so that the initial jet leaving the valve again adheres to the nozzle.

20. An apparatus as claimed in claim 11, further including nozzle means detachably mounted to said chamber for controlling the direction of flow from said injector wherein the nozzle means may be changed to vary the direction and/or type of flow from the injector.

21. Apparatus as claimed in claim 1, wherein the second injection means comprise a first series of disc injectors of which a straight portion of the generatrix of a disc seat is inclined steeply relative to the injector axis in penetrate further than the peripheral layers of the fluid fuel, and a second series, downstream of the first series, in which the straight portion of the said generatrix is only slight inclined, thereby creating a highly cohesive whirling jet enabling the central portion of the fluid fuel to be reached due to reflection of the sheet from the straight portion.

22. Apparatus as claimed in claim 21 wherein the second injectors situated downstream and/or upstream are connected individually or collectively to at least two separate ducts for extinguishing fluid.

23. Apparatus as claimed in claim 1, wherein the axes of the first and second injection means are perpendicular to the axis of the pipe.

24. A method of extinguishing flames in a pipe carrying a fluid fuel and for preventing ignition or re-ignition of the fuel comprising:
   a. forming fine diverging jets of particles of extinguishing fluid by a first injection of said extinguishing fluid through nozzles into the bore of said pipe thereby creating large and substantially adjacent volumes of a homogenous mixture of fuel and extinguishing fluid within said pipe, said homogenous mixture being equispaced around the axis of said pipe; and
   b. tangentially injecting extinguishing fluid into said pipe for creating a turbulent zone across a complete cross-section of fuel flow in said pipe between the point of said first injection and the location of the fire thereby mixing said large volumes of a homogenous mixture with any remaining portions of said fuel which have not been homogenously mixed, whereby a single large volume of a homogenous mixture of fuel and extinguishing fluid is created across the whole cross-section of said pipe.

25. The method according to claim 24 wherein the homogeneous mixing is created by the symmetrical injection of the fire-extinguishing fluid and the turbulence is created by the speed of the fuel and the penetration of the injected fluid.

* * * * *

UNITED STATES PATENT OFFICE
CERTIFICATE OF CORRECTION

PATENT NO. : 3,763,936
DATED : October 9, 1973
INVENTOR(S) : Georges H. MENAGE

It is certified that error appears in the above-identified patent and that said Letters Patent are hereby corrected as shown below:

IN THE SPECIFICATION:

Col. 5, line 21, "circuit" should read --circular--.

Col. 7, line 12, "lever" should read --level--.

IN THE CLAIMS:

Claim 21, line 5 (Col. 9, line 10), after "in", insert

-- order to produce a whirling sheet of extinguishing liquid which will not--.

Signed and sealed this 8th day of April 1975.

(SEAL)
Attest:

RUTH C. MASON
Attesting Officer

C. MARSHALL DANN
Commissioner of Patents
and Trademarks